Sept. 20, 1927.
R. SIRL
1,643,034
STEERING KNUCKLE
Filed Oct. 21, 1926
2 Sheets-Sheet 1
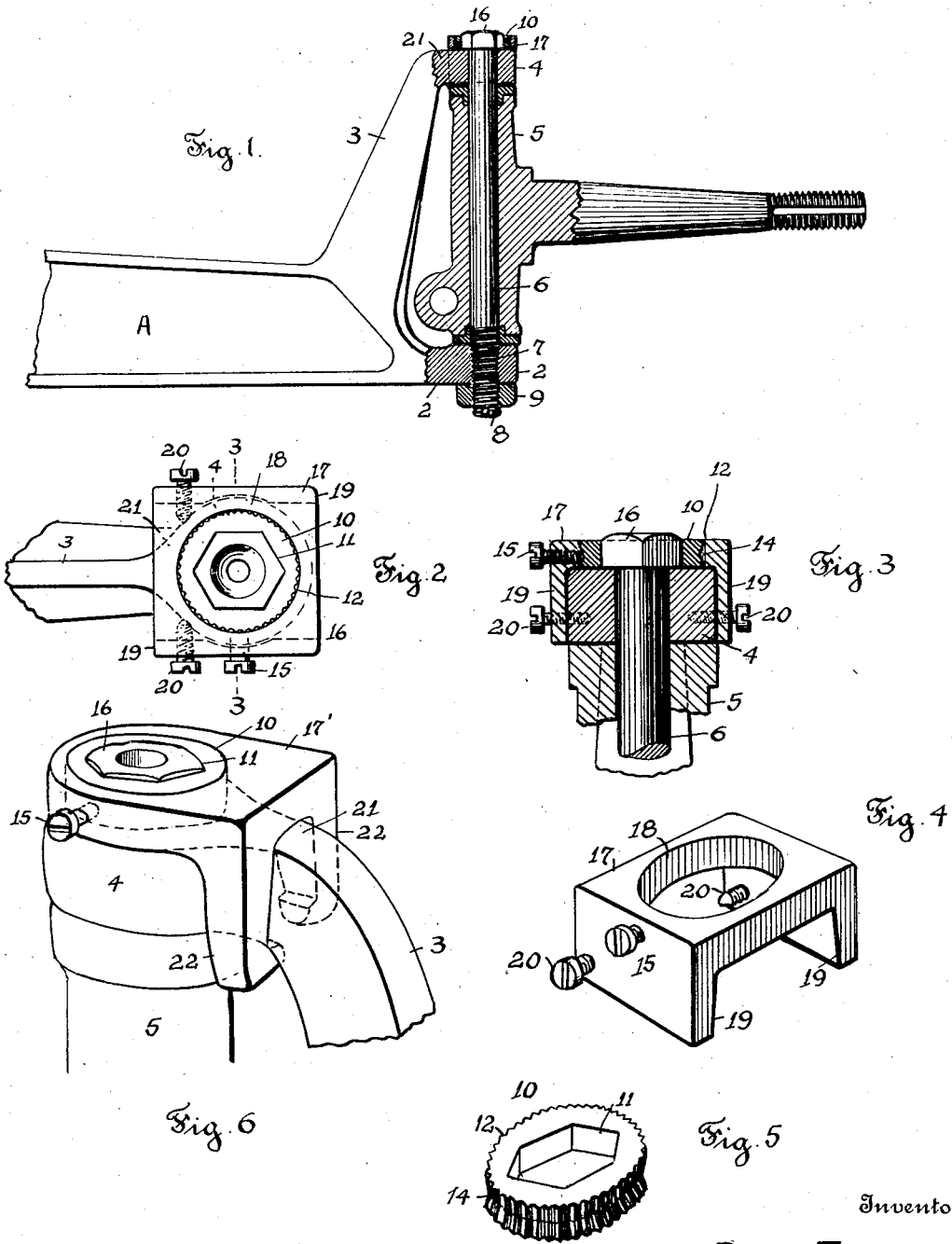
Inventor
RALPH SIRL
By Fisher, Miller & ...
Attorney Sept. 20, 1927. 1,643,034
R. SIRL
STEERING KNUCKLE
Filed Oct. 21, 1926 2 Sheets-Sheet 2
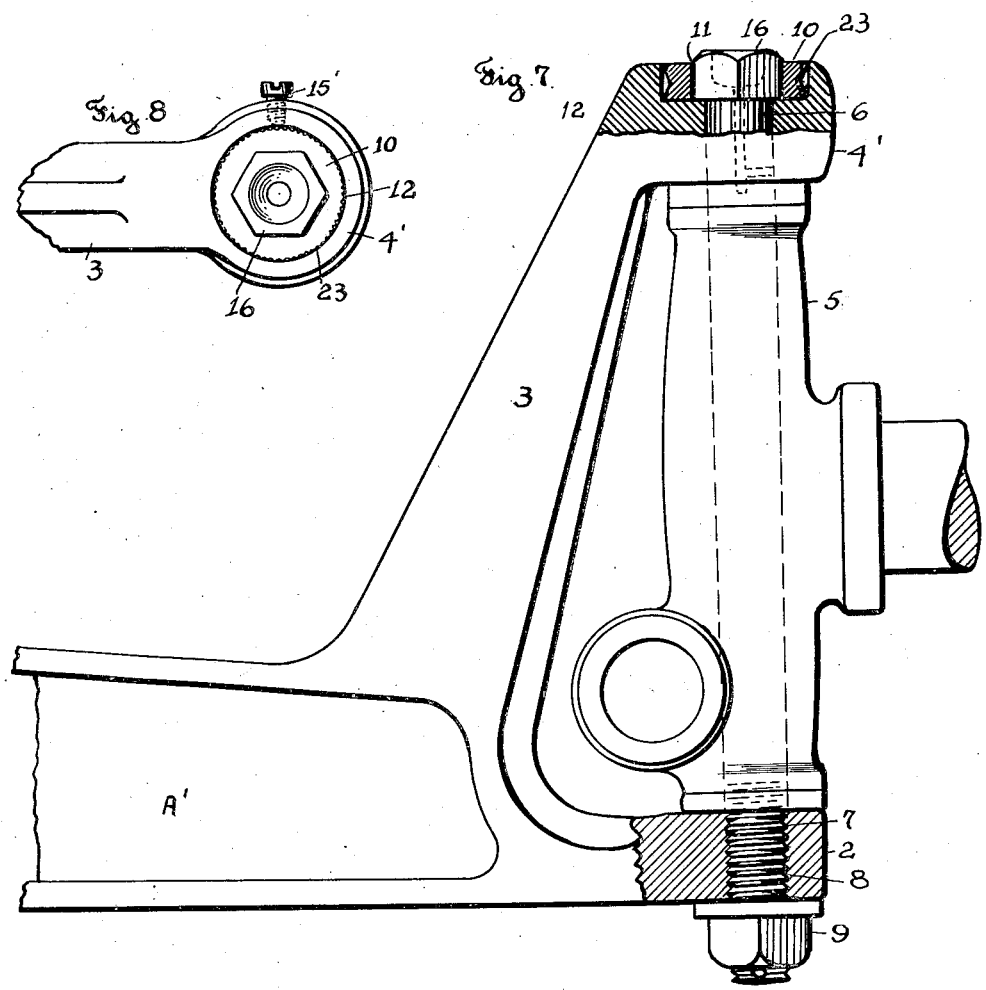
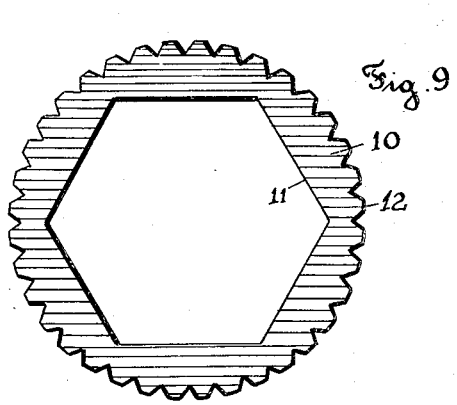
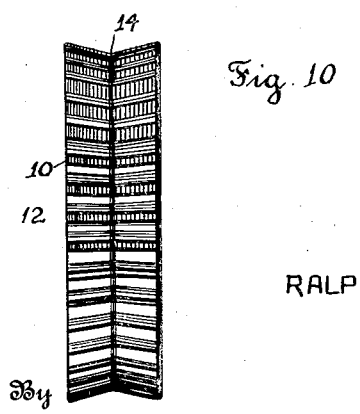
Inventor
RALPH SIRL Patented Sept. 20, 1927.

1,643,034

UNITED STATES PATENT OFFICE.

RALPH SIRL, OF CLEVELAND, OHIO.

STEERING KNUCKLE.

Application filed October 21, 1926. Serial No. 143,072.

My invention relates to an improvement in steering knuckles for automobiles, and in general my object is to provide means for locking the pivot bolt of a steering knuckle fixedly to the axle, all substantially as herein shown and described and more particularly pointed out in the claims.

In a well known make of automobile in general use the front axle is forked at its ends and the steering knuckles or spindle members are secured thereto by bolts having screw-threaded connection with the lower branches of the forks. Neglect in lubricating the joint or long exposure to the elements causes the bolt to rust and become in effect a rigid part of the steering knuckle or oscillatory spindle member, thereby causing the bolt to turn with the knuckle regardless of the screw and nut connection. The screw-threads and the openings in the forks then wear out and loose play and rattle results, and difficulty is also experienced in removing the rusted bolt from the knuckle or spindle member. The present invention is designed to lock the pivot bolt securely to both branches of the fork on the axle to avoid the troubles aforesaid, all substantially as hereinafter shown and described and more particularly pointed out in the claims.

In the accompany drawings Fig. 1 is a front elevation and sectional view of one forked end of an axle and a steering knuckle equipped with my improved bolt locking device. Fig. 2 is a top view, on a larger scale, of the same locking parts. Fig. 3 is a sectional view on line 3—3 of Fig. 2. Fig. 4 is a perspective view of the locking yoke, and Fig. 5 a similar view of the locking collar. Fig. 6 is a perspective view of a modified form of locking yoke applied to the same locking collar as in use. Fig. 7 is a side elevation, partly in section, of an axle having an upper forked part especially constructed to receive a locking collar made according to my invention, and Fig. 8 is a top view of the same parts. Figs. 9 and 10 are face and edge views, respectively, on a larger scale, of the locking collar.

As generally constructed the forked end of axle —A— comprises a short horizontal branch 2 and a vertical arm 3 terminating in a short horizontal branch 4 between which a steering knuckle or spindle member 5 is confined. Member 5 and branches 2 and 4 have axially aligned openings vertically therein adapted to receive a pivot bolt 6, and the opening 7 in lower branch 2 is screwthreaded to receive the screw-threaded end 8 of the bolt. A nut 9 is used to lock the bolt against turning. However it frequently happens that constant oscillatory movements of knuckle member 5 tend to rotate the bolt with stripping or marring effect on the screw-threads, especially when the bolt and knuckle member accumulate rust, or severe binding strains tend to rotate the bolt, or when nut 9 becomes loose. To prevent such rotatable movement of the bolt I provide a round flat locking collar 10 having a hexagonal opening 11 in its center and formed with serrations or teeth 12 in its outer circular edge. Preferably the lands of these teeth are beveled or concaved and in Fig. 10 I show the serrated edge of the collar beveled reversely to provide an annular central depression 14 between the ends of the teeth. The serrated formation of collar 10 facilitates safe and secure locking of the collar itself when engaged by a set screw 15 after the collar has been slipped over the hexagonal head 16 of bolt 6, and which set screw forms part of a yoke member 17 having a circular opening 18 in its top adapted to receive the collar. Yoke 17 comprises depending flanges 19—19 adapted to slip over and engage the sides of round branch 4, and locking screws 20—20 pass through these flanges and bear against the opposite sides of the neck portion 21 of branch 4 to hold the yoke in place and prevent its rotation, see Fig. 2. Collar 10 being locked within yoke 17 by set screw 15, the bolt head 16 is in turn locked against turning by the sleeve or collar 10, and the bolt cannot be rotated in either direction. Bolt 6 is screwed into branch 2 until the hexagonal head 16 of the bolt is seated tightly upon the top of branch 4, and the flat sides of this hexagonal head may not always square up or lie parallel with the longitudinal median line of the axle. Collar 10 is therefore rotatably mounted within yoke 17 to permit the attachment of the collar to the bolt head, and set screw 15 fixes the collar against rotation after the parts have been assembled. Screws 20 lock the yoke upon the forked branch 4, but in lieu of using screws for that purpose I may provide a yoke 17' made of malleable or ductile metal having spaced locking lugs 22—22 adapted to straddle and interlock with neck 21 as shown in Fig. 6.

In Figs. 7 and 8, I show a specially constructed axle —A'— having an ear or branch 4' formed with a counter-opening or recess 23 in its top adapted to confine collar 10. In this case only a single set screw 15' is required to secure the collar and the bolt head 16 jointly against rotation. However, the collar is the same structurally as in the other forms of the invention.

The present invention is a safeguard against accident, especially against breakage of the pivot bolt at its weakest place, to wit, the screw-threads. Sand and dirt work into the screw-threads when an unlocked bolt works loose, thus grinding and wearing the bolt thinner until a severe jolt breaks the bolt and the wheel drops off. This cannot happen when the bolt is locked according to my invention.

What I claim is:

1. A forked axle having a steering knuckle, a headed pivot bolt for said knuckle, a locking collar adapted to be sleeved over the head of said bolt, and a locking yoke for said collar adapted to be secured to one forked part of said axle.

2. A forked axle, a steering knuckle pivotally mounted within the forked part of said axle, a pivot bolt having a flat sided head, a collar having a flat sided opening adapted to receive said bolt head, a yoke member having an opening adapted to receive said collar, means adapted to lock said collar to said yoke, and means adapted to lock said yoke to a forked part of said axle.

3. A forked axle, a bolt having screw-threaded connection with a forked part of said axle, a steering knuckle supported upon said bolt, a locking collar for said bolt having a serrated circumference, and a set screw fixedly secured to a forked part of said axle adapted to engage the serrated part of said collar.

4. A forked axle, a steering knuckle having a pivot bolt secured to said forked part of said axle, a locking collar for said bolt having a channeled and serrated periphery, and a set screw fixedly secured to a forked part of said axle adapted to enter the channeled an serrated periphery of said collar.

5. A forked axle, a steering knuckle, a pivot bolt for said knuckle, a locking collar for said bolt, and a locking yoke for said collar having depending portions adapted to embrace a forked part of said axle.

6. A forked axle, a steering knuckle, a pivot bolt for said knuckle, a locking collar for said bolt, a set screw adapted to secure said collar and bolt together, a yoke for said collar, and locking devices adapted to secure said yoke to a forked part of said axle.

7. An axle having a forked end, a steering knuckle having a pivot bolt screw-connected with said forked end, a hexagonal head for said bolt, a separate locking collar having a hexagonal opening for said bolt head, and means adapted to lock said collar to said forked end of the axle.

8. An axle having a forked end, a bolt having a wrench-engaging head and screw-threaded at its opposite end to screw connect with one forked part of the axle, a steering knuckle pivotally connected to said bolt, a collar adapted to sleeve upon and interlock with said bolt head, and means adapted to secure said collar fixedly against rotation upon said forked axle end.

9. An axle having forked extremities, one of said extremities having a recess in its top, a steering knuckle, a pivot bolt for said steering knuckle screw-connected with one of said axle extremities and having a head seated within the recess in the other extremity, a separate collar adapted to be sleeved over the bolt head and to be rotated within the said recess together with said head, and means adapted to lock said collar fixedly within said recess.

In testimony whereof I affix my signature.

RALPH SIRL.